United States Patent
Juliano

(10) Patent No.: US 10,306,310 B2
(45) Date of Patent: May 28, 2019

(54) SYSTEM AND METHOD FOR RECOMMENDING A CONTENT SERVICE TO A CONTENT CONSUMER

(71) Applicant: V. Juliano Communications, LLC, Norwalk, CT (US)

(72) Inventor: Virginia Juliano, Norwarlk, CT (US)

(73) Assignee: V. Juliano Communications, LLC, Norwalk, CT (US)

( * ) Notice: Subject to any disclaimer, the term of this patent is extended or adjusted under 35 U.S.C. 154(b) by 0 days.

(21) Appl. No.: 15/994,809

(22) Filed: May 31, 2018

(65) Prior Publication Data

US 2018/0278992 A1 Sep. 27, 2018

Related U.S. Application Data

(63) Continuation of application No. 15/229,954, filed on Aug. 5, 2016, now Pat. No. 10,015,544.

(51) Int. Cl.

| | |
|---|---|
| H04N 21/258 | (2011.01) |
| H04N 21/442 | (2011.01) |
| H04N 21/45 | (2011.01) |
| H04N 21/466 | (2011.01) |
| H04N 21/475 | (2011.01) |
| G06Q 10/00 | (2012.01) |

(52) U.S. Cl.
CPC ....... H04N 21/44213 (2013.01); G06Q 10/00 (2013.01); H04N 21/4508 (2013.01); H04N 21/4662 (2013.01); H04N 21/4758 (2013.01); H04N 21/25891 (2013.01)

(58) Field of Classification Search
CPC .................................................... H04N 21/25
See application file for complete search history.

(56) References Cited

U.S. PATENT DOCUMENTS

| | | | |
|---|---|---|---|
| 8,566,142 B2 | 10/2013 | McCarney et al. | |
| 8,660,975 B2 | 2/2014 | Gionis et al. | |
| 9,264,785 B2 | 2/2016 | Mallinson | |
| 2002/0045154 A1 | 4/2002 | Wood et al. | |
| 2005/0022239 A1* | 1/2005 | Meuleman | G06F 17/30035 |
| | | | 725/46 |
| 2009/0198509 A1 | 8/2009 | Dumoff | |
| 2014/0067596 A1 | 3/2014 | McGovern et al. | |
| 2014/0222806 A1 | 8/2014 | Carbonell | |

OTHER PUBLICATIONS

International Search Reportand Written Opinion issued (dated Oct. 12, 2017) in corresponding International Application No. PCT/US2017/045335.

* cited by examiner

*Primary Examiner* — Michael H Hong
(74) *Attorney, Agent, or Firm* — Lerner, David, Littenberg, Krumholz & Mentlik, LLP

(57) ABSTRACT

A system for assisting a content consumer to select content services, the system including a processor that is configured to execute a matching algorithm. The matching algorithm comprises interviewing the content consumer for questions in a plurality of categories, determining a point system for answers obtained by the interviewing step, wherein the answers indicate entertainment interests of the content consumer; calculating a service score for each content service based on the point system, wherein the service score indicates an agreement between a content service and the entertainment interests of the content consumer; and selecting a pre-determined number of content services based on the service score.

8 Claims, 9 Drawing Sheets

| Category | Selection | Importance Rank |
|---|---|---|
| Content Type | Sports Fanatic | 1 |
|  | TV & Movie Maven | 2 |
|  | Family First | 3 |
| Watching Device | TV | 1 |
|  | Computer | 2 |
|  | Tablet | 3 |
| Internet Service | Broadband/Wi-Fi | 1 |
|  | Wireless | 2 |
| Price Range | $36 to $50 | N/A |

FIG. 5

| Category | Selection | Total Points |
|---|---|---|
| Content Type | Sports Fanatic | 8000 |
| | TV & Movie Maven | 5334 |
| | Family First | 2667 |
| Watching Device | TV | 1000 |
| | Computer | 667 |
| | Tablet | 333 |
| Internet Service | Broadband/Wi-Fi | 1000 |
| | Wireless | 500 |
| Price Range | $36 to $50 | N/A |

FIG. 6

| Service | Content Type | Ranking | Points | Service Score |
|---|---|---|---|---|
| Hulu | TV & Movie Maven | 1 | 5334 | 16001 |
| | Sports Fanatic | 2 | 8000 | |
| | Family First | 3 | 2667 | |
| RazorFish | Sports Fanatic | 1 | 8000 | 13334 |
| | TV & Movie Maven | 2 | 5334 | |

FIG. 7

| Service | Service Score | Monthly Price |
|---|---|---|
| Hulu | 20667 | $7.99 |
| RazorFish | 13334 | $49.99 |
| Amazon Prime | 5499 | $8.25 |
| Netflix | 1500 | $8.99 |

FIG. 8

SYSTEM AND METHOD FOR RECOMMENDING A CONTENT SERVICE TO A CONTENT CONSUMER

This is a continuation application of U.S. application Ser. No. 15/229,954, filed on Aug. 5, 2016, the entirety of which is incorporated herein by reference.

BACKGROUND

With the proliferation of mobile devices and Over-the-Top ("OTT") internet video services, content consumers have moved from a TV-centric audience to one that uses multiple platforms, devices and internet delivery methods and access to an unprecedented amount of entertainment choices. Content consumers now have an exponential amount of variety in how they discover and consume content and have drifted away from traditional media distributors/aggregators (cable, satellite and telco companies) such as Comcast, DirecTV and Verizon to newer, internet delivered platforms such as Amazon, Netflix, and Hulu. In the past, these traditional distributors/aggregators and media outlets acted as the intermediate layer between content creators and content consumers and exerted complete control over consumers' options. Commonly, these traditional distributors/aggregators offer limited options of content packages to the consumer with hundreds of channels that most consumers do not want or watch at bloated costs.

Today content consumers are actively seeking entertainment solutions that fit their own interests, rather than waiting for the content to be delivered to them via distributors/aggregators. Increasing numbers of people are "cutting the cord" (doing away with their cable/satellite/telco TV subscription) and utilizing alternate internet-delivered means of accessing television, movie and other content (via services like Netflix, Amazon, Hulu, etc.). These OTT video services are continuing to proliferate. Even pay TV networks like HBO, Showtime, CBS, ESPN, etc. are creating their own OTT offshoots. There are literally hundreds of legitimate OTT services out there. This has generated so many potential options and combinations for consumers, that the choices have become overwhelming.

Although it is exciting to have many options to choose from, these splintered offerings of content services have made it increasingly difficult for consumers to figure out the best solution for their individual needs. Even for younger generations, who are familiar with OTT services and mobile devices the expectation of ubiquity, accessibility and a customized offering has not been satisfied. In addition, it has become challenging for content and technology providers to reach potential content consumers via a comprehensive destination to help influence their entertainment choices.

SUMMARY

There is a need to help a content consumer to select an entertainment package that is specifically designed for that particular content consumer. The system and method as set forth in the present application provide a matching algorithm that assists a user to cobble together a content offering according to their preferences. The system and method offers disenfranchised consumers a way to navigate the confusing amount of choices in the rapidly evolving internet TV landscape and customize their choices into a group of personally relevant content services or channels. The system and method as set forth in the present application "interviews" (asks questions of) a content consumer about his or her interests in a plurality of categories, each having a plurality of options for the consumer to select and/or prioritize. After the interview, the system and method determine and recommend a plurality of content services to that content consumer based on the consumer's interests obtained through the interview, as well as choices that are relevant to the consumer's preferences, but over their chose price range. The system and method further provides functions for subscribing to a content service, such as a direct link to the provider's website or a bid platform accessible by content providers to place bids on providing a content service to a content consumer at the consumer's desired price point.

According to an aspect of the present application, the present application is directed to a system for assisting a content consumer to select types of content. The system includes a processor that is configured to execute a matching algorithm. The matching algorithm comprises interviewing the content consumer for questions in a plurality of categories (including but not limited to preferred content type(s), device(s) and internet delivery method(s), determining a point system for answers obtained by the interviewing step, wherein the answers indicate overall entertainment interests of the content consumer; calculating a service score for each content service based on the point system, wherein the service score indicates a relationship between a content service and the aggregate entertainment interests of the content consumer; and selecting a pre-determined number of content services based on the services' scores.

According to an embodiment of the present application, for each category, the interviewing step provides a plurality of selections for the content consumer to make and/or prioritize.

According to various embodiments, the matching algorithm determines the number of categories that are answered by the content consumer and the number of selections that are made in each category by the content consumer. The matching algorithm assigns an inter category weight to each category that is answered by the content consumer based on the choices and/or the prioritizations of the content consumer. The matching algorithm reassigns the inter category weight each time the content consumer makes selections in each additional category. The matching algorithm assigns an importance rating to each selection made by the content consumer. The matching algorithm assigns an intra category weight to each selection made by the content consumer based on the importance prioritization and the selections that are made by the content consumer. The point system assigns points for the selections that are made by the content consumer. The matching algorithm determines which content services are a match with any of the selections that are made by the content consumer, and when a match is determined between a content service and a consumer's selections, the point assigned to that matched selection is aggregated to the service score of that content service.

According to yet other embodiments, the interviewing step interviews the content consumer for their preferred entertainment price range. The interviewing step also interviews the content consumer for entertainment interests in content type, watching device, and network connection.

According to yet other embodiments, the processor is further configured to execute a subscription method, the subscription method comprising accepting a subscription request of a content service from the content consumer; and submitting the subscription request to a content provider for approval. The subscription method further comprises accepting a subscription request of a content service from the content consumer; and requesting bids for the subscription request from a plurality of content providers.

According to another aspect, the present application is directed to a matching method for assisting a content consumer to select content services. The matching method comprises interviewing the content consumer for questions in a plurality of categories, determining a point system for answers obtained by the interviewing step, wherein the answers indicate entertainment interests of the content consumer; calculating a service score for each content service based on the point system, wherein the service score indicates an agreement between a content service and the entertainment interests of the content consumer; and selecting a pre-determined number of content services based on the service score.

According to another aspect, the present application is directed to a non-transitory computer-readable medium storing an executable program that, when executed, causes a processor that is configured to execute a matching algorithm as set forth in the embodiments of the present application.

BRIEF DESCRIPTION OF THE DRAWINGS

The above and other objects, features, and advantages of various embodiments as set forth in the present disclosure will be more apparent from the following detailed description of embodiments taken in conjunction with the accompanying drawings.

FIG. 5 illustrates an interview outcome of a content consumer according to an embodiment of the present application.

FIG. 6 illustrates a point system for the interview outcome of FIG. 5 according to an embodiment of the present application.

FIG. 7 illustrates a category service score for content services according to an embodiment of the present application.

FIG. 8 illustrates an overall service score for content services according to an embodiment of the present application.

DETAILED DESCRIPTION

It will be appreciated by those ordinarily skilled in the art that the foregoing brief description and the following detailed description are exemplary (i.e., illustrative) and explanatory of the subject matter as set forth in the present disclosure, but are not intended to be restrictive thereof or limiting of the advantages that can be achieved by the present disclosure in various implementations.

Figure 1:
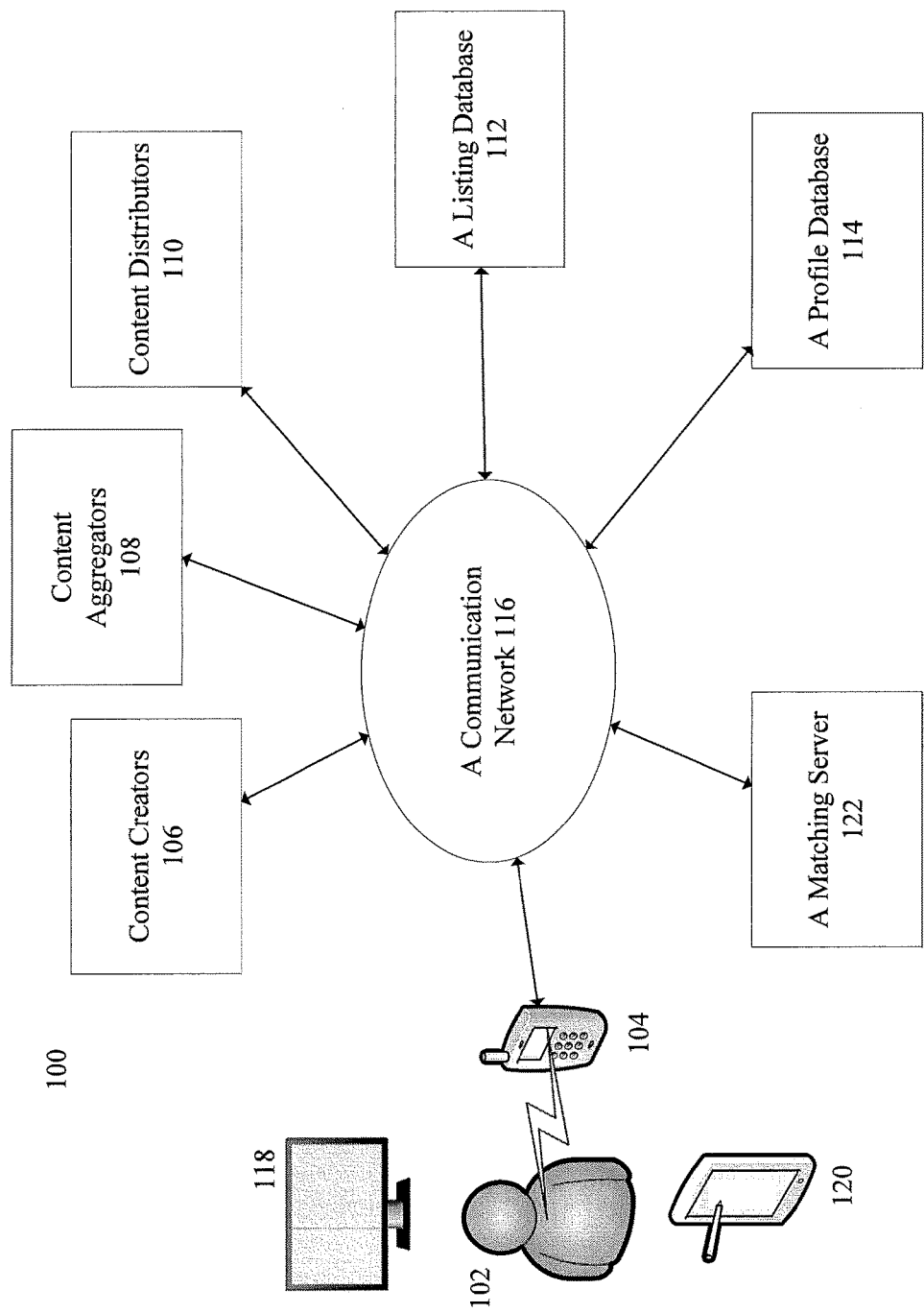
FIG. 1 illustrates a system according to an embodiment of the present application.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like FIG. 1 illustrates a system 100 for recommending a content service for a content consumer according to an embodiment of the present application. The system 100 includes a content consumer 102, who has an access to a communication network 116 via an electronic device, such as a smartphone 104, a television 118, or a tablet 120. The content consumer 102 uses the communication network 116 for many activities, such as entertaining, social networking, digesting news, and shopping. According to one embodiment, the content consumer 102 uses the system 100 for watching media contents, such as TV shows, news, movies, videos, sports, and etc.

The system 100 also includes content creators 106 and content aggregators/distributors 108. The content creators 106 refer to those parties who create original content. Generally speaking, content creators 106 include studios, movie makers, TV stations, artists, and even amateur video makers. A content aggregator 108 refers to an individual or organization that gathers contents from content creators 106 for reuse or resale. In a traditional model of providing contents to end consumers, the content creators 106 and the content aggregators 108 do not made their assets directly available to consumers. Rather, the content aggregators 108 collect and syndicate contents from the content creators 106, and then the content aggregators 108 resell the collected contents to the content distributors 110, which then distribute the contents to the content consumer 102. Traditional content distributors 110 may include Comcast, DirecTV and Verizon. In addition, newly operated content distributors 110 may include Hulu, Amazon, Netflix and YouTube. In certain situations, the content creator 16, the content aggregator, and the content distributor may be one single party. In addition, any one of the content creator, the content aggregator, and the content distributor may be understood as a content provider.

The communication network 116 allows the content consumer 102 to communicate with the content creators 106, the content aggregators 108, and the content distributors 110. The communication network 116 should be broadly construed to include any one or more of a number of types of networks that may be created between devices using an internet connection, a LAN/WAN connection, a telephone connection, a wireless connection, a short message system (SMS), a satellite connection, and so forth. An electronic device, for example, a server, a computer, a phone, a table, or a TV, may be operatively connected to network 116, via a wire network, such as a cable or a serial bus such as IEEE 1394, or via a wireless transmission medium such as 3G, 4G, or LTE networks. The terms "coupled with," "operatively connected," "operatively coupled," and "communicatively coupled", as used herein, mean that the elements so connected or coupled are adapted to transmit and/or receive data, or otherwise communicate. The communication network 116 may comprise various configurations and protocols including a cable network, the internet, World Wide Web, intranets, virtual private networks, wide area networks, local networks, private networks using communication protocols proprietary to one or more companies, Ethernet, WiFi and HTTP, cloud and cloud based services, and various combinations of the foregoing.

According to an embodiment of the present application, the system 100 includes a listing database 112, a profile database 114, and a matching server 122 that are used for providing a matching service to the content consumer 102. In general, the listing database 112 stores information of content services that are available for subscription by the content consumer. The profile database 114 stores an entertainment profile of the content consumer 102. The matching server 122 selects and recommends services listed in the database 112 to the content consumer 102.

The content creators, content aggregators, and content distributors may create a content service and then list that content service in the listing database 112. A content service used in the present application may be understood as a package of a plurality of broadcast channels, an add-on subscription, a streaming channel, a network, a broadcast channel, TV series, a show, a movie, a live match broadcast, a segment video on demand, a video game, a podcast or similar media contents.

As the content service covers a wide range of media contents, descriptions of these content services are needed for a content consumer to preview and select a content service to consume. Thus, for each content service listed in the listing database 112, a record is created for that content service, which includes a wide range of information of that content service. In one embodiment, the present system may use the description of a content service provided by a content creator without any modification. According to another embodiment, the system and method may create additional descriptions for a content service based on the subscription information provided by the content provider. The subscription information includes price and the minimum period of a subscription. The record may further include technical features related to the content service, such as device types, screen resolutions, audio formats, and transmitting speed of a network connection. Other descriptions may include copyright information, language, geographical zones, genres, images, logos, etc. The record may further include a summary of the media content, including creator, cast, plot, ratings, and reviews.

The listing database 112 may use any known methods to organize the records of stored content services. In one embodiment, the records of the listing database 112 are stored in a plurality of relational tables, each table storing the information related to a content service in one predetermined category. For example, information related to watching device, network connection, and content type may be stored in separate tables, which are linked with each other by an ID of a content service. The number of records in the listing database 112 may be freely updated by the content creators 106, the content aggregators 108, or the content distributors 110 or may be updated by these parties upon permission from a manager of the listing database 112. In another embodiment, the content creators 106, the content aggregators 108, and the content distributors 110 may provide the information of a content service to the manager, who updates a corresponding record in the listing database 112.

The profile database 114 is used to store information of a content consumer 102 that is relevant to his or her entertaining interests. For example, the consumer 102 may set up an account in the profile database 112 that includes his or her identification information, contact information, image and payment information. In addition, the consumer 102 may create an entertainment profile including his or her interests in the media contents. According to an embodiment of the present application, the entertainment profile also includes device information of electronic devices used by the consumer 102 to consume contents and the connection information of the network used by the devices. The device information includes device type, such as TV, smartphone, computer, or a wearable device. The connection information includes a type of the communication network, such as a broadband connection or wireless/mobile service. The profile database 114 further stores history information of the account, including previous and current selections of content services by a consumer and reviews of those services by the consumer, interview selections, video watching preferences, cord cutting information and other demographic information. The profile database 114 also provides communications to other social networking platforms, such as Facebook, Twitter, or Google+, such that the consumer can share their selection of content services with friends by posting his or her selected content service on a social networking platform and via email.

The matching server 122 has matching algorithms installed on a hardware platform for selecting and recommending content services to the consumer 102. As introduced in the Background of the present application, there are a large number of content services listed in the listing database 112 that a content consumer 102, without any assistance from an intelligent algorithm, would not be able to make an effective selection of content services that fit his or her needs. The matching server obtains relevant information from the input of the content consumer 102 and/or the entertainment profile stored in the profile database 114 and then searches the content services available in the listing database to find content services that have an agreement with the entertainment interests of the consumer from a points perspective. According to an embodiment, the matching server 122 rates and ranks the searched content services and presents the content services based on the selections and prioritizations of the content consumer 102. After the content consumer 102 makes their selections, the matching server 122 communicates with the content creators 106, the content aggregators 108, and the content distributors 110 (via database integration) and allows the content consumer 102 to complete their subscription. According to some embodiments of the present application, the matching server 122 further provides to the content consumer promotion information of a content service, such as coupon codes or discounts. Detailed descriptions of the matching server 122 will be provided in the following sections of this application.

As used in the present application, a server, a system, or an electronic device may comprise a full-sized personal computer, a mobile device, a wearable device, or even a virtual device capable of exchanging data over a network. For example, a server, a system, or an electronic device may be an iPhone, an Android enabled smart phone, a Blackberry phone, an iWatch, an iPad, or another internet-capable device. A virtual device may be a device created by virtual reality technologies.

Figure 2:
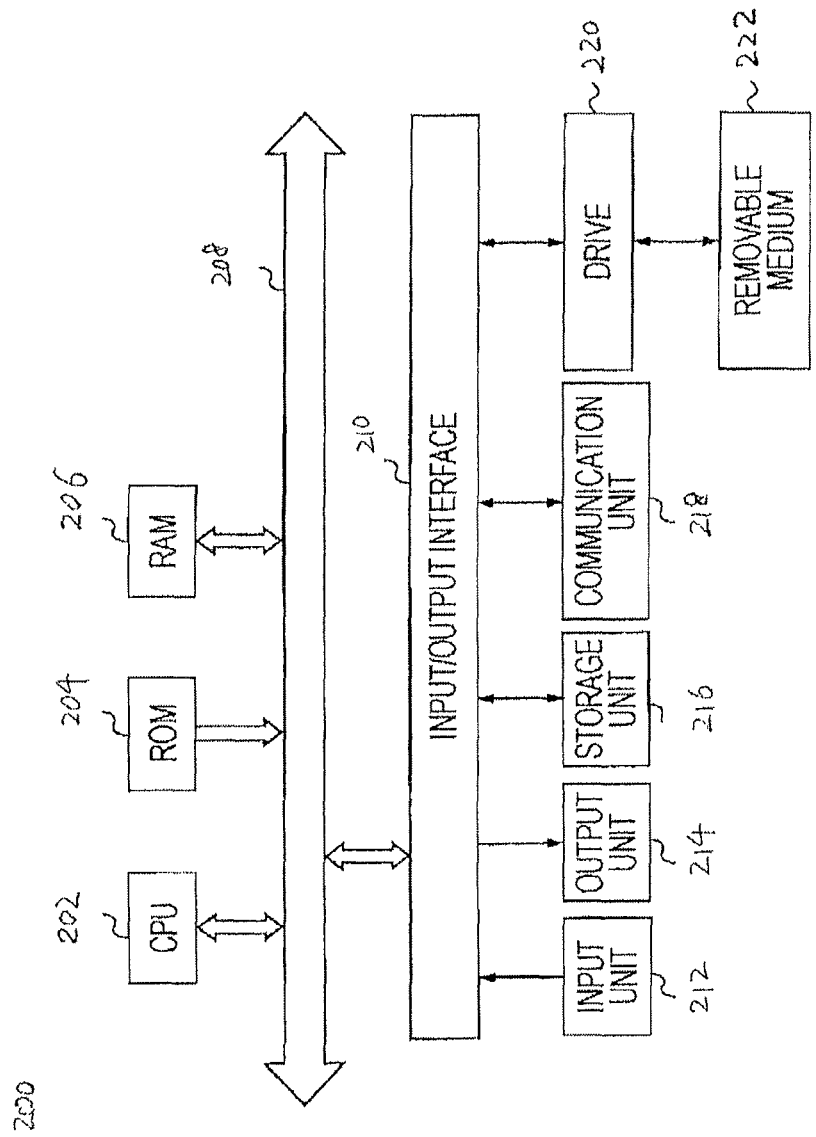
FIG. 2 illustrates an exemplary structure of an electronic device according to an embodiment of the present application.

FIG. 2 illustrates an exemplary structure 200 of a server, a system, or an electronic device according to an embodiment. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202, such as a microprocessor, executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by a user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A removable medium 222 formed of a magnetic disk, an optical disc, a magneto-optical disc, flash or EEPROM, SDSC (standard-capacity) card (SD card), or a semiconductor memory is loaded as appropriate into the drive 220. The drive 220 reads data recorded on the removable medium 222 or records predetermined data on the removable medium 222.

An operating system such as Microsoft Windows 7®, Windows XP® or Vista™, Linux®, Mac OS®, or Unix® may be used by the terminal. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable memory such as a magneto-optical disk or SD card and others within a read-only computer chip. Some or all of the instructions and data may be stored in a location physically remote from, yet still accessible by, the processor. Similarly, the processor may actually comprise a collection of processors which may or may not operate in parallel. As will be recognized by those skilled in the relevant art, the terms "system," "terminal," and "server" are used herein to describe a computer's function in a particular context. A terminal may, for example, be a computer that one or more users work with directly, e.g., through a keyboard and monitor directly coupled to the computer system. Terminals may also include a smart phone device, a personal digital assistant (PDA), thin client, or any electronic device that is able to connect to the network and has some software and computing capabilities such that it can interact with the system. A computer system or terminal that requests a service through a network is often referred to as a client, and a computer system or terminal that provides a service is often referred to as a server. A server may provide contents, content sharing, social networking, storage, search, or data mining services to another computer system or terminal. However, any particular computing device may be indistinguishable in its hardware, configuration, operating system, and/or other software from a client, server, or both. The terms "client" and "server" may describe programs and running processes instead of or in addition to their application to computer systems described above. Generally, a (software) client may consume information and/or computational services provided by a (software) server.

Figure 3:
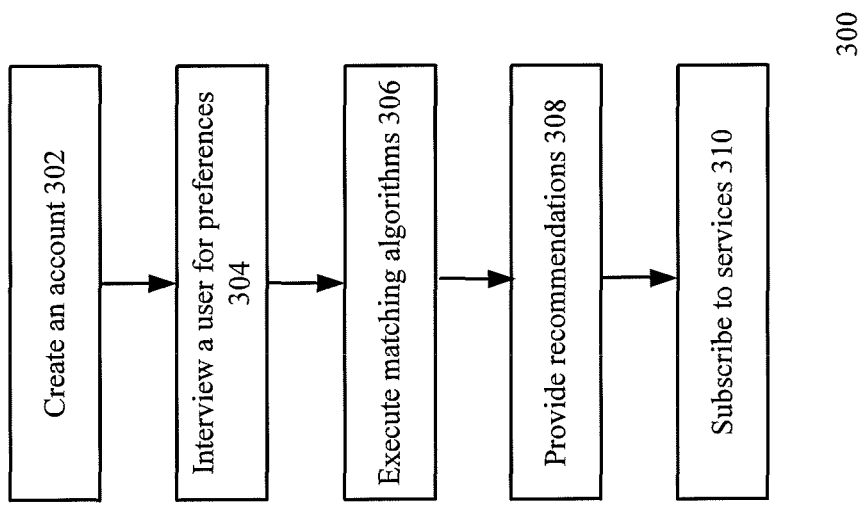
FIG. 3 illustrates a matching method according to an embodiment of the present application.

FIG. 3 illustrates an overall recommending process 300 for selecting a content service for a content consumer according to an embodiment of the present application. In step 302, a content consumer sets up an account in the profile database. The account of the content consumer includes information about the content consumer's personal information such as name, mailing address, email address, contact information, and age. The account of the content consumer also includes the content service that the content consumer is currently using, including the name of the content service, price of the content service, and personal reviews of that content service. A general profile may be created to include the personal information and the current content service of the content consumer. In addition, the account also includes an entertainment profile that includes information about a content consumer's preferences of content service, including a selection history of content services, a preferred budget for content services, devices used for consuming contents, network connections for consuming contents, and preferred types of contents. Both the personal profile and entertainment profile are available for the matching server 122 to access when the matching server 122 executes matching algorithms.

In step 304, a content consumer is interviewed for preferences related to content services. The term "interview" used in the present application may be generally understood as an interaction between the content consumer and the present system, which is conducted to obtain relevant information about entertainment interests of the content consumer. For example, an interview may be implemented as a conversation in natural languages between the content consumer and the matching server. An interview may also be implemented as a questionnaire or a survey that is to be answered by the content consumer. During an interview, the content consumer may use any available input functions, such as a mouse, a touch screen, a microphone, or a camera, to input his or her information. In one embodiment of the present application, a voice input function is provided by the matching server for the content consumer to input his or her answers by speaking to the matching server. The voice input function uses voice recognition algorithms, which are known to a person of ordinary skill in the art, to analyze acoustic characteristic from the content consumer and extract the relevant information from the analysis. The voice input function may also be used during step 302 or other steps as set forth in the present application.

According to one embodiment, step 304 may obtain relevant information directly from the account set up by the consumer. The information obtained from the account may also be presented to the consumer for confirmation purposes. According to another embodiment, step 304 requests a content consumer to answer questions in a plurality of categories. The plurality of categories may include content type, watching device, network service, and price range. In the content type category, the content consumer is presented with a plurality of options and is asked to select what type of contents ("content type") to she or he would like to watch. The content type may include those information, such as genre or ratings, provided by a content provider. According to one embodiment, the system and method according to the present application recreates a plurality of content types that are independent from those provided by the content creator. For example, while a content type provided by a content provider may be known as "sports," which refers to contents of all sport channels, a newly created content type by the system of the present application may be called as "Sport Fanatics," which covers media contents provided by sport channels with high ratings from viewers. In the watching device category, the step 302 requests the content consumer to select a device for consumer a piece of content. The selections may include computer, tablet, smartphone, TV, or watch. The selections may also include screen resolutions or manufacturers as additional selections. In the network category, the step 302 asks the content consumer to select connection types, such as Broadband, Wi-Fi, Wireless, 3G, 4G, and etc. In the price range category, the step 302 asks the content consumer to input his or her budget for content services. The budget may be a precise amount or may be a range. For each category, a content consumer may make one selection or make a plurality of selections.

The content consumer may also choose to skip one category. Thus, the number of categories answered by the consumer and the number of selections in each category made by the consumer vary from one interview to another. For example, a consumer may choose to make one selection in one category, while another consumer may choose to make three selections in four categories. The system and method of the present application include algorithms that select content services according to the interview outcome, such as the number of answered categories and the number of made selections in each category. An embodiment of the algorithm will be described in detail in FIG. 4.

In step 306, the matching server 122 executes a matching algorithm by using the information obtained in step 304. In one embodiment, the matching server 122 ranks the content services stored in the listing database 112 according to service scores calculated based on the interview of step 304. In one embodiment, the matching algorithm determines a point system for the selections made by the content consumer. The point system includes points for each category of answered question and each selection made in one category. It is noted that the point system is updated each time the content consumer answers a new category of information or makes a new selection. The point system is independent from the content service listed in the database, in which an update of the listing database does not affect the point system. Then, the matching algorithm calculates a plurality of service scores for each content service according to the point system. In one embodiment, the plurality of service scores include a first service score for individual category or selection and a second service score that represents the total score of all service scores of a content service.

In step 308, the matching server 122 selects a predetermined number of content services in each category based on the service score. In addition, the matching server selects a predetermined number of content services based on an overall service score of a content service. The selected content services are presented to a consumer together with their price information. As a result, the consumer can identify the content services that fit his or her interests in each category.

In step 310, the process 300 provides functions related subscription for the consumer. For example, when a consumer selects a content service, the system will accept the subscription request from the consumer and then submit the subscription request to the corresponding content provider for approval. In another embodiment, the system will direct the consumer to the subscription webpage of the content provider. In another embodiment, the system will receive the selection from the consumer and then set up a bidding process among the content providers so that the consumer will receive the best offer from the content providers.

Figure 4:
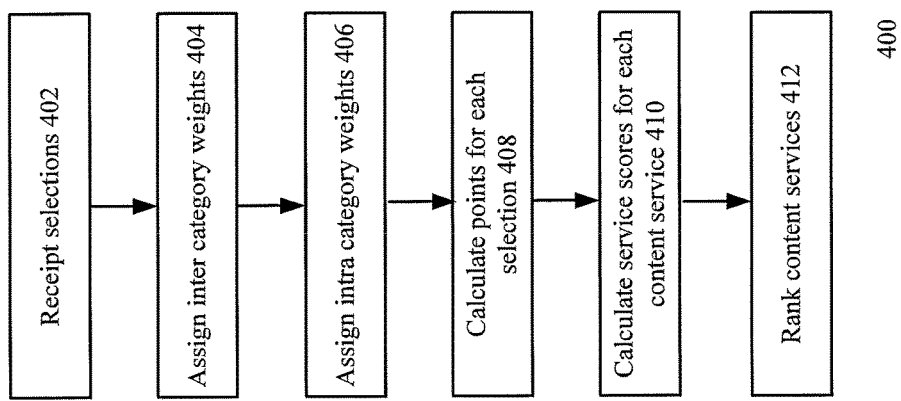
FIG. 4 illustrates an algorithm for ranking content services according to an embodiment of the present application.

FIG. 4 illustrates a matching method 400 for determining the point system included in step 306 according to an embodiment of the present application. The matching method 400 includes step 402 that obtains the answered categories and selections during an interview of a consumer, step 404 that determines inter category weights for answered categories, step 406 that determines intra category weights for selections made by the consumer, step 408 that determines the points for each selection made by the consumer, step 410 that calculates the service score for each content service based on the points assigned in step 408, and step 412 that ranks content services based on the service scores calculated in step 410.

In step 404, each category of questions that has been answered by a consumer is assigned an inter category weight. The inter category weight is reconfigured based on the number of categories answered by the consumer. In one embodiment, the inter category weights are assigned equally among all answered categories. For example, if three categories have been answered, then each category will have an intra category weight of 0.33. If four categories have been answered, then each category will have an intra category weight of 0.25. In another embodiment, the intra category weight is used to represent the importance of each category among the plurality of categories, which have been pre-set before the interview. For example, information about "content type" may be assigned a greater weight than a category of "watching device" or "network connection." In another embodiment, the category of "price range" is not assigned any category weight because it is not used to rank a content service, but is used to control the aggregation of the content services.

In step 406, for each category, the number of selections made by the consumer is determined. An intra category weight is determined for each selection depending on the number of options input by the content consumer and an importance rank of that option. In general, the more options made by a content consumer, the less weight is assigned to each option, and the higher the importance rank is, the greater the intra category weight is. In one embodiment, the importance rank is determined based on the order when the content consumer makes that selection. For example, the first selection made by a content consumer has the highest importance rank, while the last selection made by a content consumer has the lowest importance rank.

In step 408, a default point, such as 100, is pre-assigned to each selection. Then, the actual point corresponding to each selection made by the consumer is calculated based on the inter category weight and the intra category weight. For example, the point assigned to a selection may be the product between the default point, the inter category weight, and the intra category weight.

In step 410, a service score for each content service is calculated. First, the record of a content service is compared with the selections that have been made by the consumer. When the record of a content service matches a selection, then that content service will obtain the points assigned to that selection. The points of a content service will keep aggregated for all matches with the selections. At least two service scores for a content service are calculated: a first service score is for individual categories that have been answered by the consumer and the second service score is for the entire selections that have been made by the consumer. The service score for a category of a content service is calculated as the total of points of all selections in a single category. The overall service score is calculated as the total of all service scores of a content service. These two service scores are used to rank the content service.

In step 412, the method 400 selects a predetermined number of content services that have the highest category service scores in each category and presents those content services to the consumer. The method 400 may also select a predetermined number of content services that have the highest overall service scores and presents those content services to the consumer. For example, the method 400 may select the first three, four, five, or six content services in each category. In one embodiment, step 412 also considers the budget limit when selecting content services for the consumer. For example, step 412 may aggregate content services in descending service score order until the price of the aggregated content services exceeds the budget set by the consumer.

FIG. 5 illustrates an example of the interview outcome according to an embodiment of the present application. The table 500 shows the interview results of a consumer, which answered questions in four categories 502, such as Content Type 508, Watching Device 510, Internet Service 512, and Price Range 514. In the category of Content Type, the consumer makes three selections 504: Sports Fanatic, TV&Movie Maven, and Family First. The Importance Rank 506 shows that the Sports & Fanatic has the highest importance rank because it was first selected by the consumer, then the TV&Movie Maven, and then the Family First. The category of Price Range, although answered, does not have an importance rank. The inter category weights for Content Type, Watching Device, and Internet & Service are assigned as 80, 10, and 10, respectively. The intra category weights in the Content Type category are assigned as 1, ⅔, and ⅓ for Sports Fanatic, TV&Movie Maven, and Family First, respectively. The same is assigned to those in the Watching Device category because it has the same number of selections as the Content Type Category. The Internet Device category has only two options Broadband/Wi-Fi and Wireless, which are assigned to an intra category weight of 1 and 0.5, respectively. It is noted that each selection has a default point of 100.

FIG. 6 illustrates a point system assigned to the example in FIG. 5 according to an embodiment of the present application. The Total Points 602 corresponding to each selection is calculated as the product of the default point and the inter category weight and the intra category weight. For example, the Sports Fanatic has 8000 points, which is calculated as 100×80×1. The Tablet selection has 333 points, which is calculated as 100×10×0.33. Therefore, each selection has been assigned a point based on the input of the content consumer. As apparent from the previous explanations, the point system in FIG. 6 is mainly determined by the interview outcome and is not affected by the listing of content services in the listing database.

FIG. 7 illustrates services scores of content services for the Content Type category according to an embodiment of the present application. The content service 702 titled "Hulu" matches with all three selections in the Content Type category 704 made by the consumer, which have points 5334, 8000, 2667, respectively. Thus, the category Service Score 708 corresponding to Hulu is 16001, which corresponds to the aggregation of 5334, 8000, and 3667. For the content service titled "RazorFish," it does not match with the selection of "Family First" made by the consumer. Thus, it has a category service score of 13334, which represents the summation of points of two selections of "Sports Fanatic" and "TV&Movie Maven."

FIG. 8 illustrates the overall service scores of content services according to an embodiment of the present application. The overall Service Score 806 of Hulu is 20667, which is greater than the Category Service Score of 16001, as shown in FIG. 7. This is because the overall service score also includes category Service Scores from the category of "Watching Device" and "Network Connection," which is in addition to the Content Type category. The price information 808 of a content service is also included in the table 800 and is presented to the consumer.

Figure 9:
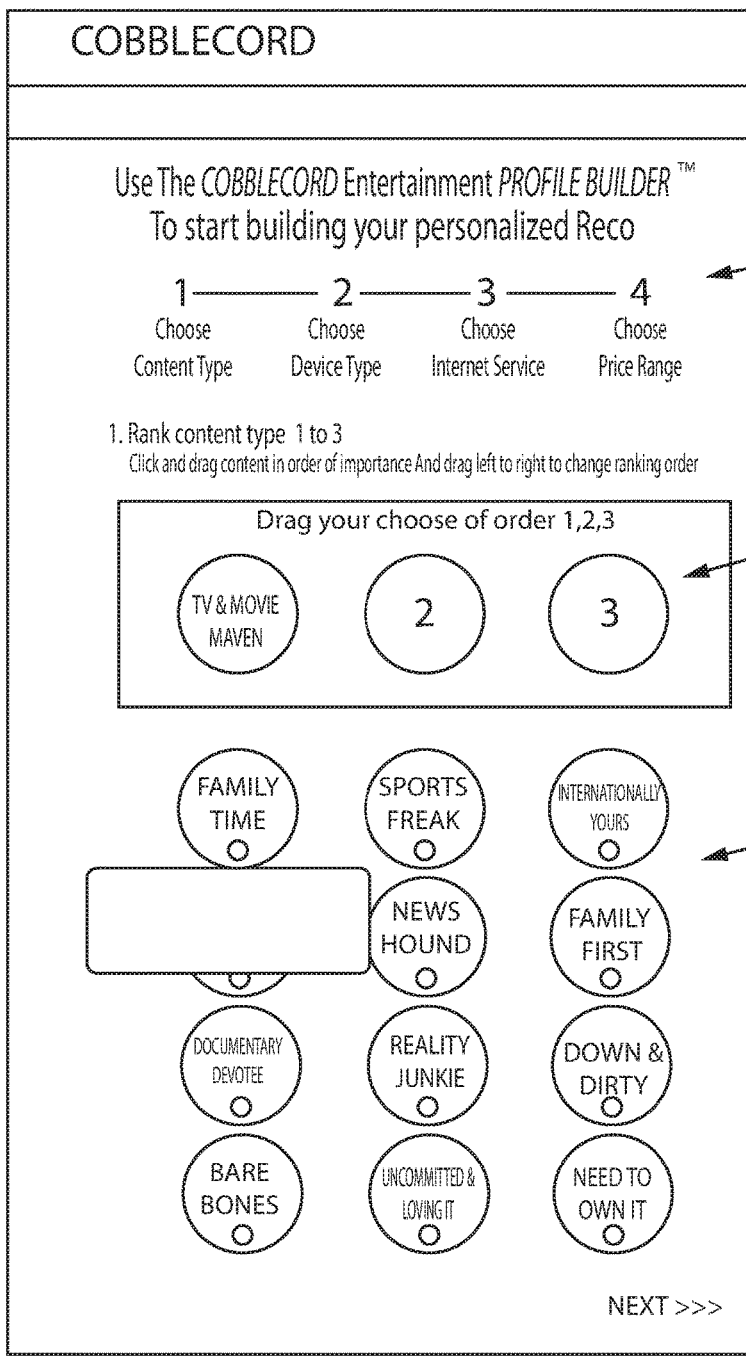
FIG. 9 illustrates a computer interface for interviewing a content consumer according to an embodiment of the present application.

FIG. 9 illustrates an interface for setting up an entertainment profile of a consumer according to an embodiment of the present application. The interface 900 includes a category indicator 902, a selection box 904, and an option section 906. The category indicator 902 indicates the information of categories to be interviewed. Although the example shows only four categories, more categories may be answered by the consumer. The selection box 904 indicates the number of selections that is made by the consumer. Again, the number of selections in 904 may be changed from one interview to another. The option section 906 indicates the available options that the consumer can select.

According to some embodiments of the present application, the system 100 monitors both the content services listed in the listing database and external services that are publically available for content and prices changes. The system 100 sends alerts on deals based on content consumers' preferences/selections, reminders when their favorite shows are returning, updates on software or hardware, tools to compare how much they are spending/saving, helpful hints, sneak peeks & previews. Content consumers are allowed to execute the selection process at any time, whenever they want to see what other services are available, whenever prices have changed, or whenever their needs/preferences have changed.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for assisting a consumer to select services, the method comprising:
providing a listing database including a plurality of services, each service having a plurality of attributes that describe features of that service;
assigning, to each service, a plurality of service descriptors based on the plurality of attributes;
assigning the plurality of service descriptors into a plurality of categories;
creating a profile of the consumer that uses service descriptors selected by the consumer to indicate interests of the consumer;
interviewing the consumer for questions in the plurality of categories,
customizing a point system for each consumer based on the profile and answers obtained by the interviewing step, the point system determining points for each service descriptor selected by the consumer, wherein the point system includes a pre-determined point assigned to selections in each category, an inter category weight assigned to an answered category, and an intra category weight assigned to each selection in an answered category;
determining a service score for each service based on the point system; and
presenting and displaying a predetermined number of services to the consumer for selection based on the service score;
wherein, for each category, the interviewing step provides a plurality of selections for the consumer to make, and a matching algorithm determines the number of categories that are answered by the consumer and the number of selections that are made in each category by the consumer;
wherein the matching algorithm assigns an inter category weight to each category that is answered by the consumer; and
wherein, for each service, the matching algorithm determines whether that service matches with any selection by the consumer, and, when a match is determined between a service and a selection, the service score of that service is calculated by aggregating a weighted point associated with the matched selection, the weighted point being determined by utilizing the pre-determined point assigned to that matched selection, the inter category weight, the intra category weight.

2. The method according to claim 1 comprising:
upon a selection of a service by the consumer, setting up a bidding process among service providers who provide the selected service.

3. The method of claim 1, wherein the presenting step include:
determining whether a cost of the predetermined number of services is below a budget included in the profile.

4. The method of claim 1, further comprising:
customizing the point system each time the consumer updates his or her profile.

5. A non-transitory recording medium storing an executable program which, when executed, causes a processor to implement a method for assisting a consumer to select services, the method comprising:
providing a listing database including a plurality of services, each service having a plurality of attributes that describe features of that service;
assigning, to each service, a plurality of service descriptors based on the plurality of attributes;
assigning the plurality of service descriptors into a plurality of categories;
creating a profile of the consumer that uses service descriptor selected by the consumer to indicate interests of the consumer;
interviewing the consumer for questions in the plurality of categories,
customizing a point system for each consumer based on the profile and answers obtained by the interviewing step, the point system determining points for each service descriptor selected by the consumer, wherein the point system includes a pre-determined point assigned to selections in each category, an inter category weight assigned to an answered category, and an intra category weight assigned to each selection in an answered category;
determining a service score for each service based on the point system;
presenting and displaying a predetermined number of services to the consumer for selection based on the service score; and
wherein, for each category, the interviewing step provides a plurality of selections for the consumer to make, and a matching algorithm determines the number of categories that are answered by the consumer and the number of selections that are made in each category by the consumer;
wherein the matching algorithm assigns an inter category weight to each category that is answered by the consumer; and
wherein, for each service, the matching algorithm determines whether that service matches with any selection by the consumer, and, when a match is determined between a service and a selection, the service score of that service is calculated by aggregating a weighted point associated with the matched selection, the weighted point being determined by utilizing the pre-determined point assigned to that matched selection, the inter category weight, the intra category weight.

6. The non-transitory recording medium according to claim 5 wherein the method further comprises:
upon a selection of a service by the consumer, setting up a bidding process among service providers who provide the selected service.

7. The non-transitory recording medium according to claim 5, wherein the presenting step include determining whether a cost of the predetermined number of services is below a budget included in the profile.

8. The non-transitory recording medium according to claim 5, wherein the method further comprises:
customizing the point system each time the consumer updates his or her profile.

* * * * *